No. 755,636. PATENTED MAR. 29, 1904.
F. P. DILL.
GRAIN DRILL.
APPLICATION FILED OCT. 24, 1903.
NO MODEL.
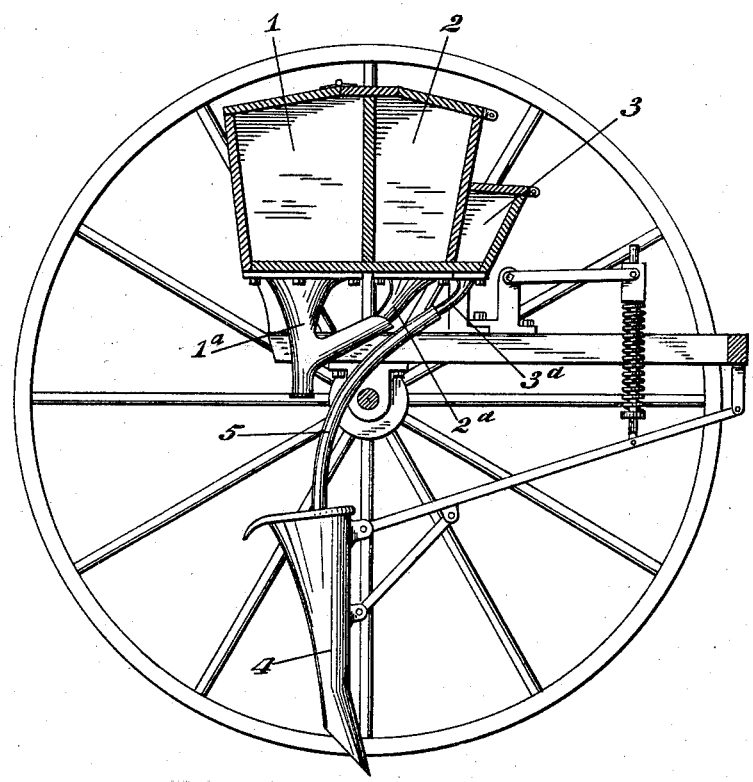
WITNESSES:
Benjamin Finckel
Henry L. Will
INVENTOR.
Frank P. Dill
BY
Finckel & Finckel
his ATTORNEYS.

No. 755,636. Patented March 29, 1904.

UNITED STATES PATENT OFFICE.

FRANK P. DILL, OF BLENDON TOWNSHIP, FRANKLIN COUNTY, OHIO.

GRAIN-DRILL.

SPECIFICATION forming part of Letters Patent No. 755,636, dated March 29, 1904.

Application filed October 24, 1903. Serial No. 178,320. (No model.)

*To all whom it may concern:*

Be it known that I, FRANK P. DILL, a citizen of the United States, residing in Blendon township, in the county of Franklin and State of Ohio, have invented certain new and useful Improvements in Grain-Drills; and I do hereby declare the following to be a full, clear, and exact description of the invention, such as will enable others skilled in the art to which it appertains to make and use the same.

Grain-drills are commonly provided with three boxes—one for the fertilizer, one for the grain-seed, and a third for the seed of grass—timothy, clover, and the like—arranged from the rear to the front of the drill in the order stated. Means for conducting the fertilizer and grain-seed into the shoe have been provided, and a conductor from a grass-seed box connected with a flexible hose leading from the fertilizer-box into the shoe for conducting grass-seed into the shoe has also been proposed; but because of the levity of grass-seed and the oftentimes sticky adherent character of fertilizer I have found it difficult to successfully conduct grass-seed through the same flexible hose as that employed for conducting fertilizer.

The object of the present invention therefore is to provide means whereby grass-seed may be conducted independently of the fertilizer-conductor to the shoe, such means being also adapted to be quickly and easily placed into and removed from the shoe, so that if grain or fertilizer are sown alone the grass-seed conductor can be placed out of the way; and my invention is embodied in the combination, with a grain-drill having a fertilizer, a grain-seed and a grass-seed box, and a shoe, of a flexible conductor attached at one end to the grass-seed spout and having its other end free, so that it can quickly be placed into or removed from the drill and its discharge end when in use not be liable to clogging.

The accompanying drawing illustrates in vertical longitudinal sectional view a grain-drill of an ordinary type, and in this view 1 designates the fertilizer-box, 2 the grain-seed box, and 3 the grass-seed box.

4 designates the shoe, which is shown to be yieldingly, and therefore agitatably, attached to the frame of the drill. The fertilizer-box has a spout $1^a$ and the grain-seed box a spout $2^a$ discharging into the shoe 4 substantially as usual. The grass-seed box has a spout $3^a$, which has heretofore in practice commonly discharged onto the ground; but I attach to this spout $3^a$ in any approval way one end of an elastic hose or tube 5 and pass the other or free end rearward over the axle of the drill and allow the same to hang freely into the shoe. The grass-seed can of course be planted simultaneously with the grain-seed and fertilizer, or with either of them, or it can be planted alone, as may be desired by the husbandman. With this construction it will be observed that there is no danger of clogging the grass-seed spout when grass is sown either alone or with grain-seed or fertilizer, first, because of the direction of the end of the grass-seed conductor in the shoe, and, second, because of the fact that the said conductor extends into the shoe, which is constantly agitated more or less in its passage through the soil. Further, it will be observed that when grain-seed and fertilizer, or either of them, is sown the flow of the grain-seed and fertilizer can be made freer, if desired, by removing from the shoe in an instant the loose free end of the grass-seed conductor, and still another considerable advantage of this combination resides in the fact that should there develop a constipation of material in the grain-seed and fertilizer conductor the grass-seed appendix need not be disturbed to relieve the trouble.

I include by the expression "grass-seed" timothy, clover, alfalfa, and any other seed or seeds too fine to be sown through the grain-drill box.

What I claim, and desire to secure by Letters Patent, is—

The combination in a grain-drill having a fertilizer-box, a grain-seed box, a grass-seed box and a shoe, of a flexible conductor connected at one end to the discharge-opening of the grass-seed box leading into the top of the shoe and hanging removably therein.

In testimony whereof I affix my signature in presence of two witnesses.

FRANK P. DILL.

Witnesses:
  BENJ. FINCKEL,
  S. W. LATHAM.